United States Patent
Yamanoi et al.

[11] Patent Number: 6,141,717
[45] Date of Patent: *Oct. 31, 2000

[54] MICROCOMPUTER HAVING BUS ISOLATION MEANS FOR SELECTIVELY COUPLING AN EXTERNAL BUS TO EITHER A MEMORY BUS OR A PERIPHERAL BUS FOR TESTING OF MEMORY AND PERIPHERAL CIRCUITS

[75] Inventors: Goro Yamanoi; Takafumi Miyanaga, both of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/084,592

[22] Filed: May 27, 1998

[30] Foreign Application Priority Data

Jan. 7, 1998 [JP] Japan .................................. 10-001914

[51] Int. Cl.[7] ...................................................... G06F 13/00
[52] U.S. Cl. ............................ 710/129; 710/128; 710/38; 714/25; 714/724
[58] Field of Search ..................................... 710/126–132, 710/36, 38; 714/718, 724, 733, 734, 25–30, 43; 703/23–28

[56] References Cited

U.S. PATENT DOCUMENTS

| 4,701,870 | 10/1987 | Mogi et al. ............................. | 702/120 |
|---|---|---|---|
| 5,107,208 | 4/1992 | Lee ......................................... | 714/733 |
| 5,138,257 | 8/1992 | Katsura .................................... | 714/43 |
| 5,198,760 | 3/1993 | Farwell .................................... | 714/724 |
| 5,214,655 | 5/1993 | Eichelberger et al. ................. | 714/733 |
| 5,297,260 | 3/1994 | Kametani ................................ | 710/113 |
| 5,434,983 | 7/1995 | Yaso et al. .............................. | 710/128 |
| 5,481,677 | 1/1996 | Kai et al. ................................ | 710/100 |
| 5,481,679 | 1/1996 | Higaki et al. ........................... | 710/128 |
| 5,483,642 | 1/1996 | Okazawa et al. ....................... | 710/126 |
| 5,771,361 | 6/1998 | Tokieda et al. ......................... | 710/131 |
| 5,784,576 | 7/1998 | Guthrie et al. .......................... | 710/103 |
| 5,862,359 | 1/1999 | Nozuyama .............................. | 713/300 |
| 5,887,144 | 3/1999 | Guthrie et al. .......................... | 710/101 |
| 5,912,899 | 6/1999 | Kim et al. ............................... | 365/201 |

FOREIGN PATENT DOCUMENTS 64-42744 2/1982 Japan .
1-109459 4/1989 Japan .

Primary Examiner—Ayaz R. Sheikh
Assistant Examiner—Sumati Lefkowitz
Attorney, Agent, or Firm—Burns, Doane, Swecker & Mathis, LLP

[57] ABSTRACT

A microcomputer for allowing a connector in a bus isolation mode to connection an external bus to either a memory bus or a peripheral bus as designated by an externally input mode signal. The microcomputer thus avoids assuming the load of both the memory bus and the peripheral bus simultaneously when the bus isolation mode is in effect. The microcomputer is capable of equalizing the additional capacities of the memory bus and peripheral bus in all modes of microcomputer operation so that tests in the bus isolation mode are carried out under the same conditions as the conditions in effect during other modes of operation, whereby highly practical and reliable test data is obtained.

10 Claims, 5 Drawing Sheets

MICROCOMPUTER HAVING BUS ISOLATION MEANS FOR SELECTIVELY COUPLING AN EXTERNAL BUS TO EITHER A MEMORY BUS OR A PERIPHERAL BUS FOR TESTING OF MEMORY AND PERIPHERAL CIRCUITS

BACKGROUND OF THE INVENTION

1. Field of the Invention

The present invention relates to a microcomputer capable of entering a mode in which internal buses are divided into two buses, one bus between a CPU and a memory (called the memory bus hereunder), the other bus between the CPU and peripheral circuits (called the peripheral bus hereunder) so that the memory and the peripheral circuits may be tested without the intervention of the CPU (the mode is called the bus isolation mode hereunder).

2. Description of the Prior Art

FIG. 6 is a block diagram of a conventional microcomputer. In FIG. 6, reference numeral 61 is a microcomputer; 62 is a CPU of the microcomputer 61; 63 is a memory such as a ROM or a RAM built in the microcomputer 61; 64 is a body of peripheral circuits such as I/O and communication circuits incorporated in the microcomputer 61; 65 is a memory bus; 66 is a peripheral bus; and 67 is an external bus located outside the microcomputer 61.

Reference characters ISO and ISOB are control signals that are outputted by the CPU 62. The signal ISOB is an inverted signal of the control signal ISO. The control signals ISO and ISOB are supplied to appropriate circuit elements that need them via a control bus, not shown. The control signal ISO is driven High when the microcomputer 61 enters the bus isolation mode; the control signal ISOB is brought High when the microcomputer 61 operates in a mode other than the bus isolation mode.

Reference numeral 68a represents a transmission gate that comprises a P- and an N-channel transistor. The transmission gate 68a is turned on and off by the control signal ISO inputted to the gate of the P-channel transistor and by the control signal ISOD inputted to the gate of the N-channel transistor. The transmission gate 68a connects the CPU 62 with the peripheral bus 66.

Reference numeral 68b denotes another transmission gate that includes a P- and an N-channel transistor. The transmission gate 68b is also turned on and off by the control signal ISO inputted to the gate of the P-channel transistor and by the control signal ISOB inputted to the gate of the N-channel transistor. The transmission gate 68b connects the CPU 62 with the memory bus 65.

Reference numeral 68e stands for another transmission gate that includes a P- and an N-channel transistor. The transmission gate 68e is turned on and off by the control signal ISOB inputted to the gate of the P-channel transistor and by the control signal ISO inputted to the gate of the N-channel transistor. The transmission gate 68e connects the peripheral bus 66 with the external bus 67.

Reference numeral 68f is another transmission gate that includes a P- and an N-channel transistor. The transmission gate 68f is turned on and off by the control signal ISOB inputted to the gate of the P-channel transistor and by the control signal ISO inputted to the gate of the N-channel transistor. The transmission gate 68f connects the memory bus 65 with the peripheral bus 66.

In operation, when the microcomputer 61 is in a mode other than the bus isolation mode, the control signal ISO is driven Low and the control signal ISOB is brought High. These settings turn off the transmission gates 68e and 68f and turn on the transmission gates 68a and 68b. At this point, the peripheral bus 66 is disconnected from the external bus 67 and the memory bus 65 from the peripheral bus 66, while the CPU 62 is connected to the peripheral bus 66 as well as to the memory bus 65. In this configuration, the CPU 62 may gain access to the memory 63 through the memory bus 65 and to the peripheral circuits 64 through the peripheral bus 66.

When the microcomputer 61 enters the bus isolation mode, the control signal ISO is driven High and the control signal ISOB is brought Low. This turns on the transmission gates 68e and 68f and turns off the transmission gates 68a and 68b. At this point, the peripheral bus 66 is connected to the external bus 67 and the memory bus 65 to the peripheral bus 66, while the CPU 62 is disconnected from the peripheral bus 66 as well as from the memory bus 65. This configuration makes it possible to gain direct access to the memory 63 and peripheral circuits 64 from the external bus 67 via the memory bus 65 and peripheral bus 66.

With the conventional microcomputer 61 of the above structure in a mode other than the bus isolation mode, suppose that the CPU 62 accesses the peripheral circuits 64. In that case, the load on the CPU 62 is constituted by the peripheral circuits 64 and by the additional capacity of only the peripheral bus 66. When the CPU 62 gains access to the memory 63, the load on the CPU 62 is constituted by the memory 63 plus the additional capacity of the memory bus 65 alone. When the microcomputer enters the bus isolation mode, on the other hand, the load on an entity attempting to access the memory 63 or peripheral circuits 64 alone from the external bus 67 is made up of not only the memory 63 or peripheral circuits 64 but also the additional capacities of both the memory bus 65 and the peripheral bus 66. As a result, the operation threshold frequency tested on and obtained from the memory 63 or peripheral circuits 64 in the bus isolation mode differs necessarily from the operation threshold frequency of the memory 63 or peripheral circuits 64 in a mode other than the bus isolation mode. This means that the test data about components of the microcomputer 61 such as the memory 63 and peripheral circuits 64, when tested and acquired in the bus isolation mode, turn out to be useless.

SUMMARY OF THE INVENTION

It is therefore an object of the present invention to provide a microcomputer capable of equalizing the additional capacities of the memory bus and peripheral bus in all modes of microcomputer operation so that tests in the bus isolation-mode are carried out under the same conditions as those for actual use by users, whereby highly practical test data are obtained.

In carrying out the invention and according to one aspect thereof, there is provided a microcomputer having a memory bus and a peripheral bus, the memory bus connecting a CPU to a memory, the peripheral bus connecting the CPU to peripheral circuits. The microcomputer comprises a connector for connecting an external bus to either the memory bus or the peripheral bus in response to an externally input mode signal in a bus isolation mode in which any one of the memory and the peripheral circuits is tested without intervention of the CPU. This structure makes it possible, with the microcomputer in the bus isolation mode, to test the memory or peripheral circuits by taking into account the same additional capacity of the memory bus or peripheral bus as that in effect in a mode other than the bus isolation mode. The inventive structure thus offers highly reliable test data.

In a preferred structure according to the invention, the connector may include: a first gate for connecting and disconnecting the external bus to and from the peripheral bus; a second gate for connecting and disconnecting the external bus to and from the memory bus;

and a control signal generator for generating control signals to control connecting and disconnecting operations of the first and the second gate. Such a simplified structure still allows tests to be carried out in the bus isolation mode and to obtain test data at high levels of reliability.

In another preferred structure according to the invention, the control signal generator may include a latch for latching the mode signal. This preferred structure, with the control signal generator incorporated in the peripheral circuits, allows the memory to be tested when the peripheral circuits are disconnected from the peripheral bus.

In a further preferred structure according to the invention, the control signal generator may include a decoder for decoding the mode signal. This simple structure allows tests to be conducted in the bus isolation mode whereby highly reliable test data are obtained.

In an even further preferred structure according to the invention, the connector may serve as a selector for selecting either the memory bus or the peripheral bus to be connected constantly in response to an external signal. This preferred and simplified structure also allows tests to be carried out in the bus isolation mode whereby highly reliable test data are acquired.

BRIEF DESCRIPTION OF THE DRAWINGS

Further objects and advantages of this invention will become apparent upon a reading of the following description and appended drawings in which.

DETAILED DESCRIPTION OF THE PREFERRED EMBODIMENTS

Figure 1:
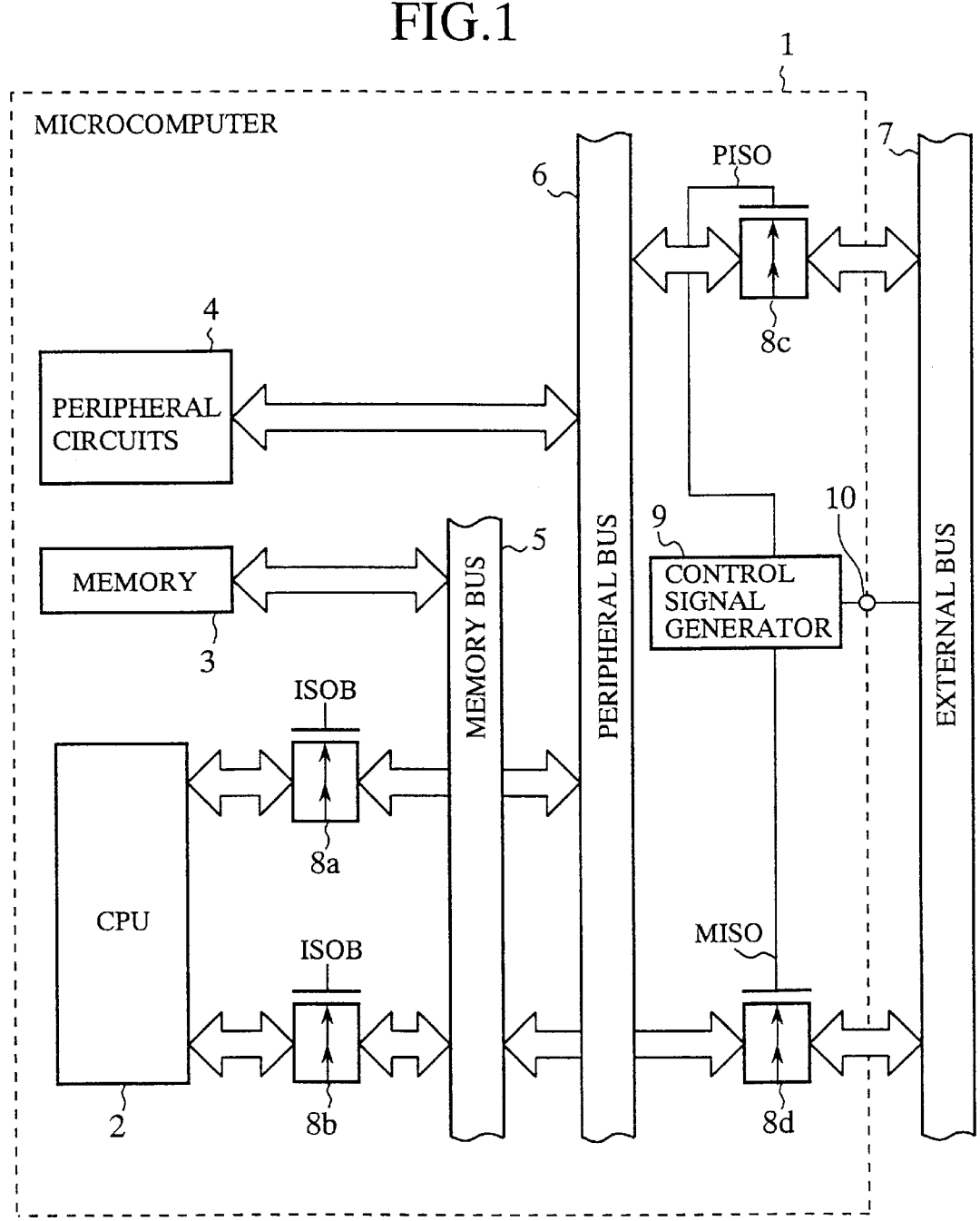
FIG. 1 is a block diagram of a microcomputer practiced as a first embodiment of the invention.

Preferred embodiments of the invention will now be described with reference to the accompanying drawings.
First Embodiment FIG. 1 is a block diagram of a microcomputer practiced as the first embodiment of the invention. In FIG. 1, reference numeral 1 is a microcomputer; 2 is a CPU included in the microcomputer 1; 3 is a memory such as a ROM or a RAM built in the microcomputer 1; 4 is a body of peripheral circuits such as I/O and communication circuits incorporated in the microcomputer 1; 5 is a memory bus; 6 is a peripheral bus; and. 7 is an external bus located outside the microcomputer 1.

Reference characters ISOB represent a control signal by the CPU 2. Reference characters PISO and MISO denote control signals (of the connecting means) generated by a control signal generator, to be described later, on the basis of a control signal ISO that is an inverted signal of the control signal ISOB. The control signals ISO, ISOB, PISO and MISO are supplied to appropriate circuit elements that need them through a control bus, not shown. The control signal ISOB is driven High when the microcomputer 1 operates in a mode other than the bus isolation mode. The control signal PISO is brought High when the microcomputer 1 enters the bus isolation mode and the external bus 7 is connected to the peripheral bus 6. The control signal MISO is driven High when, with the microcomputer 1 in the bus isolation mode, the external bus 7 is connected to the memory bus 5.

Reference numeral 8a stands for a transmission gate that comprises a P- and an N-channel transistor. The transmission gate 8a is turned on and off by the control signal ISO inputted to the gate of the P-channel transistor and by the control signal ISOB inputted to the gate of the N-channel transistor. The transmission gate 8a connects the CPU 1 with the peripheral bus 6.

Reference numeral 8b indicates a transmission gate that also comprises a P- and an N-channel transistor. The transmission gate 8b is turned on and off by the control signal ISO inputted to the gate of the P-channel transistor and by the control signal ISOB inputted to the gate of the N-channel transistor. The transmission gate 8b connects the CPU 2 with the memory bus 5.

Reference numeral 8c denotes a transmission gate (first gate means in the connecting means) that includes a P- and an N-channel transistor. The transmission gate 8c is turned on and off by the control signal PISO inputted to the gate of the N-channel transistor and by a control signal PISOB inputted to the gate of the P-channel transistor. The control signal PISOB is an inverted signal of the control signal PISO. The transmission gate 8c connects the peripheral bus 6 with the external bus 7.

Reference numeral 8d is a transmission gate (second gate means in the connecting means) made up of a P- and an N-channel transistor. The transmission gate 8d is turned on and off the by the control signal MISO inputted to the gate of the N-channel transistor and by a control signal MISOB inputted to the gate of the P-channel transistor. The control signal MISOB is an inverted signal of the control signal MISO. The transmission gate 8d connects the memory bus 5 with the external bus 7.

Reference numeral 9 represents a control signal generator (control signal generating means in the connecting means). Based on the control signal ISO and a mode signal, the control signal generator 9 either feeds the control signals PISO and PISOB to the transmission gate 8c or supplies the control signals MISO and MISOB to the transmission gate 8d. The mode signal is inputted from the external bus 7 to determine whether the memory bus 5 or the peripheral bus 6 is to be connected to the external bus when the microcomputer 1 is in the bus isolation mode. Reference numeral 10 stands for a mode signal input terminal that permits inputting the mode signal to the control signal generator 9 through the external bus 7.

Figure 2:
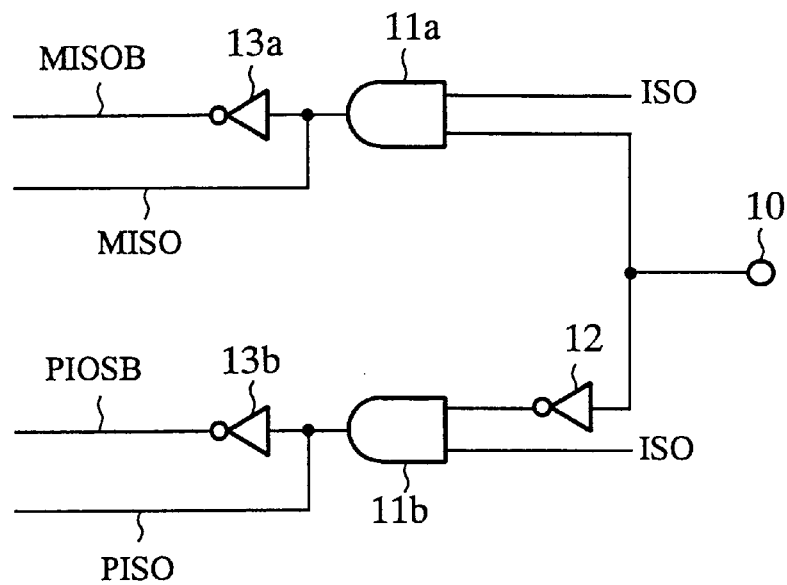
FIG. 2 is a circuit diagram of a control signal generator included in the first embodiment.

FIG. 2 is a circuit diagram showing a typical constitution of the control signal generator 9. In FIG. 2, reference numeral 11a is an AND gate (control signal generating means in the connecting means). One of the input terminals of the AND gate 11a is supplied with the mode signal from the mode signal input terminal 10; the other input terminal of the AND gate 11a is fed with the control signal ISO.

Reference numeral 12 stands for an inverter (control signal generating means in the connecting means), and 11b for another AND gate (control signal generating means). One of the input terminals of the AND gate 11b is supplied with the mode signal inverted by the inverter 12; the other input terminal of the AND gate 11b is fed with the control signal ISO. Reference numeral 13a indicates another inverter (control signal generating means in the connecting means). The inverter 13a inverts the control signal MISO, which is an output signal from the AND gate 11a, to provide the control signal MISOB (connecting means). Reference numeral 13b represents another inverter (control signal generating means in the connecting means) that inverts the control signal PISO, an output signal from the AND gate 11b, to provide the control signal PISOB (connecting means).

How the microcomputer 1 works will now be described. When the microcomputer 1 operates in a mode other than the bus isolation mode, the control signal ISOB is driven High to turn on the transmission gates 8a and 8b. The gate settings connect the CPU 2 to the peripheral bus 6 and memory bus 5. In this configuration, the CPU 2 may gain access to the memory 3 via the memory bus 5 or to the peripheral circuits 4 through the peripheral bus 6. At this point, the control signal ISO goes Low, thereby driving Low the control signals MISO and PISO outputted by the AND gates 11a and 11b of the control signal generator 9. This turns off the transmission gates 8c and 8d, disconnecting the external bus 7 from the peripheral bus 6 and memory bus 5.

When the microcomputer 1 is in the bus isolation mode, the control signal ISO is brought High and the control signal ISOB driven Low to turn off the transmission gates 8a and 8b. This disconnects the CPU 2 from the peripheral bus 6 and memory bus 5.

If the mode signal inputted through the external bus 7 and mode signal input terminal 10 is High, the control signal MISO outputted by the AND gate 11a is driven High and the control signal PISO outputted by the AND gate 11b is brought Low. This turns off the transmission gate 8c and turns on the transmission gate 8d. The gate settings disconnect the peripheral bus 6 from the external bus 7 and connect the memory bus 5 to the external bus 7. This means that the external bus 7 is connected to the memory bus 5 alone, which allows only the memory 3 to be accessed from the external bus 7.

If the mode signal is Low in the bus isolation mode, the control signal MISO outputted by the AND gate 11a is driven Low and the control signal PISO outputted by the AND gate 11b is brought High. This turns on the transmission gate 8c and turns off the transmission gate 8d. The gate settings connect the peripheral bus 6 to the external bus 7 and disconnect the memory bus 5 from the external bus 7. That is, the external bus 7 is connected to the peripheral bus 6 alone, which allows only the peripheral circuits 4 to be accessed from the external bus 7.

As described, when the microcomputer 1 of the first embodiment is in the bus isolation mode, the variable level of the mode signal causes either the memory bus 5 or the peripheral bus 6 alone to be selected as the internal bus connected to the external bus 7. That is, a simply structured microcomputer allows reliable test data to be obtained in the bus isolation mode.

Second Embodiment

The microcomputer 1 practiced as the second embodiment is basically the same in overall constitution as the first embodiment of FIG. 1 except that the second embodiment has its control signal generator 9 included in the peripheral circuits 4. An overall constitution of the microcomputer as the second embodiment will thus be omitted from the appended drawings.

Figure 3:
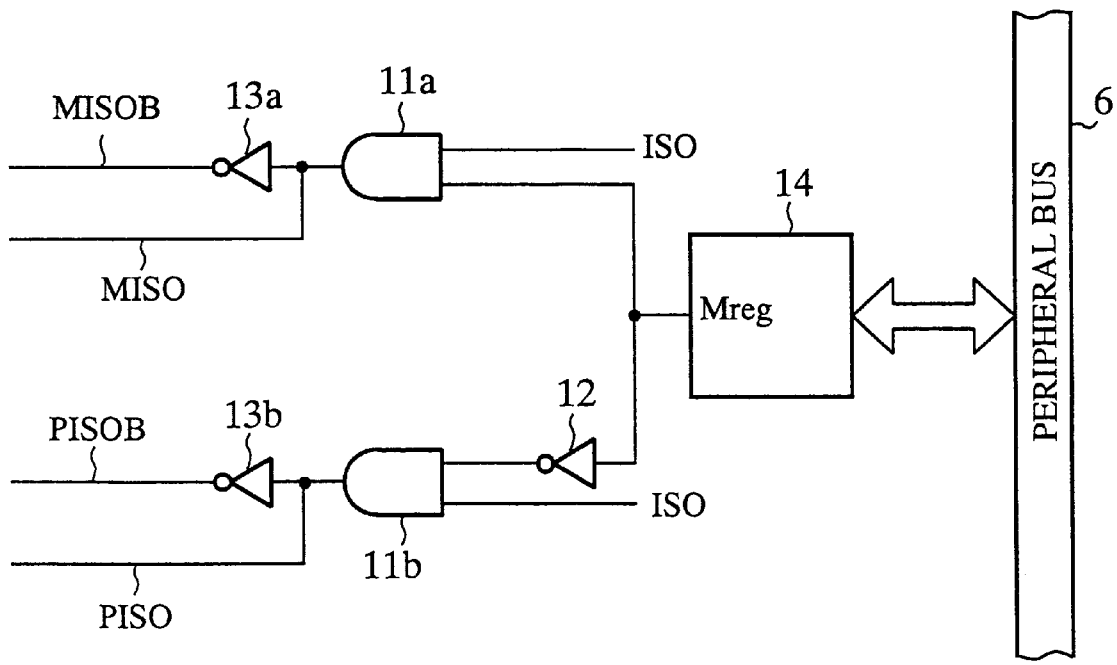
FIG. 3 is a circuit diagram of a control signal generator in a microcomputer practiced as a second embodiment of the invention.

Different from its counterpart in the first embodiment, the control signal generator of the second embodiment is structured as shown in FIG. 3. Of the reference numerals in FIG. 3, those already used in FIG. 2 designate like or corresponding parts, and their descriptions are omitted where repetitive.

In FIG. 3, reference numeral 14 denotes a single-bit mode register (latch means of the control signal generating means in the connecting means). The mode register 14 is connected to the peripheral bus 6. A mode signal Mreg latched by the mode register 14 is inputted to one of the input terminals of the AND gate 11a as well as to the inverter 12.

How the second embodiment works will now be described. When the microcomputer 1 is in a mode other than the bus isolation mode, the workings of the microcomputer are the same as those of the first embodiment and thus will not be described further.

When the microcomputer 1 is in the bus isolation mode, the control signal ISO is driven High and the control signal ISOB is brought Low. This turns off the transmission gates 8a and 8b (FIG. 1), disconnecting the CPU 2 from the memory bus 5 and peripheral bus 6.

If the mode signal Mreg latched by the mode register 14 is High in the above state, the control signal MISO is driven High and the control signal PISO is brought Low. This turns off the transmission gate 8c and turns on the transmission gate 8d (FIG. 1), disconnecting the peripheral bus 6 from the external bus 7 and connecting the memory bus 5 to the external bus 7. That is, only the memory bus 5 is connected to the external bus 7, which allows the memory 3 alone to be accessed from the external bus 7. When the peripheral bus 6 is disconnected from the external bus 7, the mode signal latched by the mode register 14 keeps the memory bus 5 alone connected to the external bus 7. This allows tests to continue in the bus isolation mode.

If the mode signal Mreg latched by the mode register 14 is Low in the bus isolation mode, the control signal MISO is driven Low and the control signal PISO is brought High. This turns on the transmission gate 8c and turns off the transmission gate 8d, connecting the peripheral bus 6 to the external bus 7 and disconnecting the memory bus 5 from the external bus 7. This means that only the peripheral bus 6 is connected to the external bus 7, which allows the peripheral circuits 4 alone to be accessed from the external bus 7.

As described when the microcomputer 1 of the second embodiment is in the bus isolation mode, the variable level of the mode signal Mreg latched by the mode register 14 causes either the memory bus 5 or the peripheral bus 6 alone to be selected as the internal bus connected to the external bus 7. With the peripheral bus 6 disconnected from the external bus 7, it is still possible to obtain reliable test data in the bus isolation mode.

Third Embodiment

Figure 4:
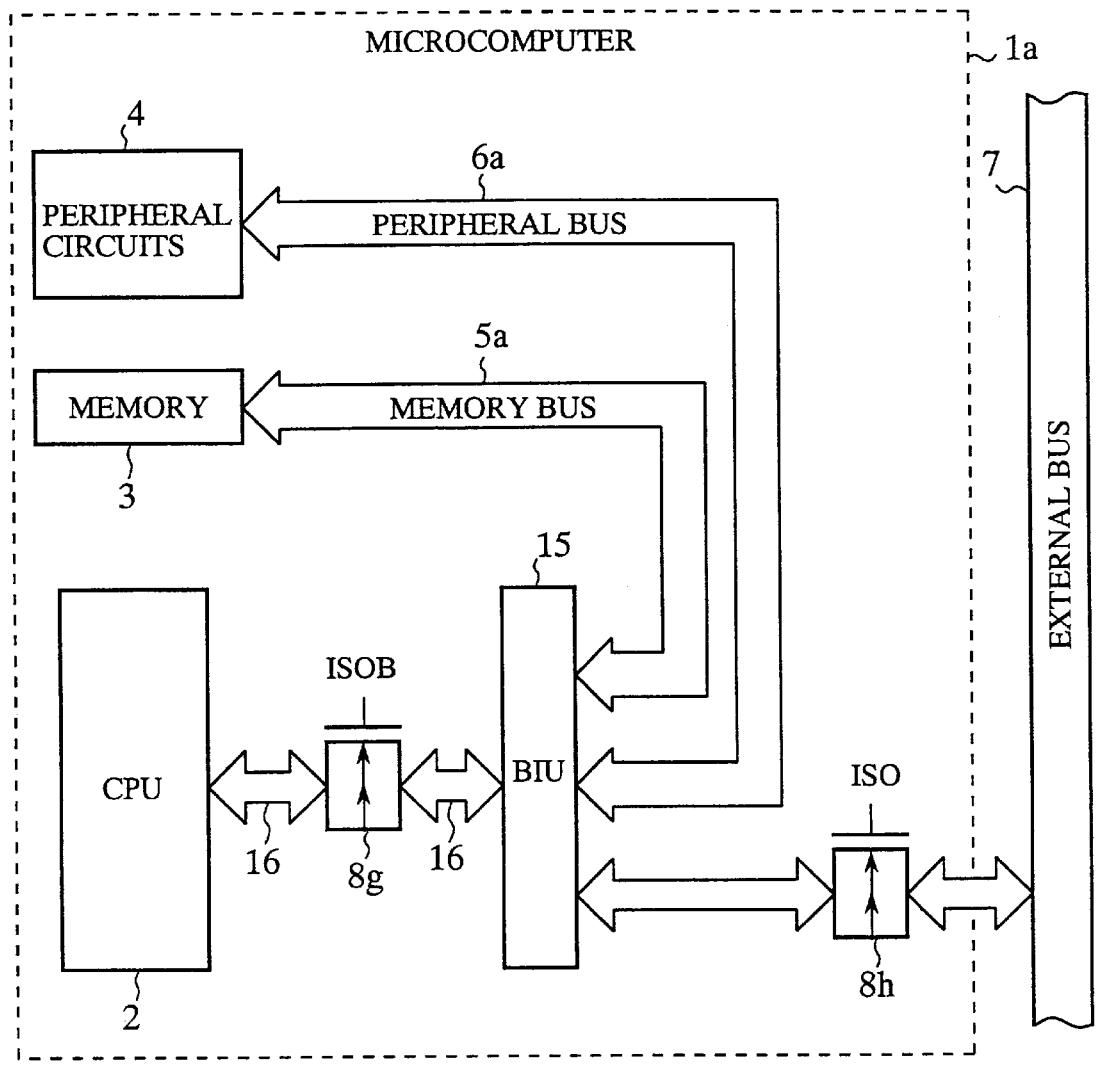
FIG. 4 is a block diagram of a microcomputer practiced as a third embodiment of the invention.

FIG. 4 is a block diagram of a microcomputer practiced as the third embodiment of the invention. Of the reference numerals in FIG. 4, those already used in FIG. 1 designate like or corresponding parts, and their descriptions are omitted where repetitive.

Reference numeral 1a stands for a microcomputer practiced as the third embodiment, 5a for a memory bus, 6a for a peripheral bus, and 15 for a bus interface unit (called the BIU hereunder; selecting means in the connecting means) that selects access to either the memory bus 5a or the peripheral bus 6a in accordance with an address signal inputted from the external bus 7. The BIU 15 is always connected to the memory bus 5a and peripheral bus 6a. Reference numeral 16 represents a CPU bus that connects the CPU 2 to the BIU 15 via a transmission gate 8g, to be described below.

The transmission gate 8g comprises a P- and an N-channel transistor. The transmission gate 8g is turned on and off by the control-signal ISO inputted to the gate of the P-channel transistor and by the control signal ISOB inputted to the gate of the N-channel transistor. The transmission gate 8g connects the CPU 2 to the BIU 15 through the CPU bus 16.

Reference numeral 8h denotes another transmission gate made up of a P- and an N-channel transistor. The transmission gate 8h is turned on and off by the control signal ISOB inputted to the gate of the P-channel transistor and by the control signal ISO inputted to the gate of the N-channel transistor. The transmission gate 8h connects the BIU 15 to the external bus 7.

How the third embodiment works will now be described.

When the microcomputer la is in a mode other than the bus isolation mode, the control signal ISOB is driven High to turn on the transmission gate 8g. The activated gate causes the CPU bus 16 to connect the CPU 2 with the BIU 15. On the other hand, the control signal ISO is brought Low, which turns off the transmission gate 8h to disconnect the BIU 15 from the external bus 7. In accordance with the address signal received from the CPU 2, the BIU 15 selects either the memory bus 5a or the peripheral bus 6a. The selected bus is connected to the CPU 2 through the CPU bus 16 and the transmission gate 8g. The CPU 2 may gain access to the memory 3 via the memory bus 5a or to the peripheral circuits 4 via the peripheral bus 6a.

When the microcomputer la is in the bus isolation mode, the control signal ISO is driven High and the control signal ISOB is brought Low to turn off the transmission gate 8g and turn on the transmission gate 8h. The gate settings disconnect the CPU 2 from the BIU 15 and connect the BIU 15 to the external bus 7. The BIU 15 selects either the memory bus 5a or the peripheral bus 6a in accordance with the address signal inputted through the external bus 7. The bus selected by the BIU 15 is connected to the external bus 7 via the transmission gate 8h. This means that the external bus 7 is connected to either the memory bus 5a or the peripheral bus 6a alone, which allows only the memory 3 or the peripheral circuits 4 to be accessed from the external bus 7.

As described, when the third embodiment is in the bus isolation mode, the BIU 15 may select either the memory bus 5a or the peripheral bus 6a for connection to the external bus 7. A simply structured microcomputer thus allows reliable test data to be acquired while operating in the bus isolation mode.

Fourth Embodiment

The microcomputer practiced as the fourth embodiment is basically the same in overall constitution as the first embodiment of FIG. 1 with the exception of a different structure of the control signal generator 9. An overall constitution of the microcomputer as the fourth embodiment will thus be omitted from the appended drawings.

Figure 5:
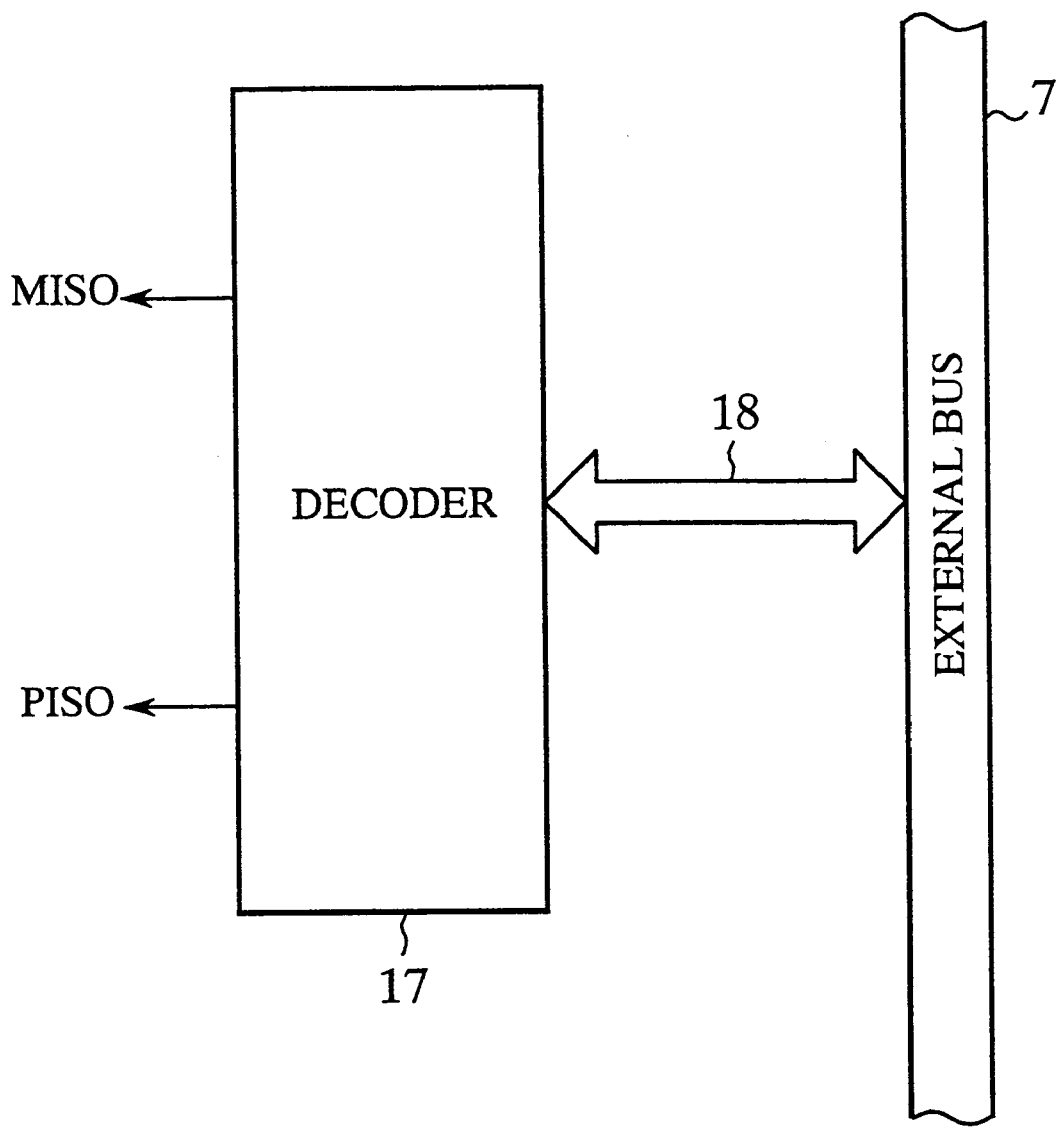
FIG. 5 is a block diagram of a control signal generator in a microcomputer practiced as a fourth embodiment of the invention.
Figure 6:
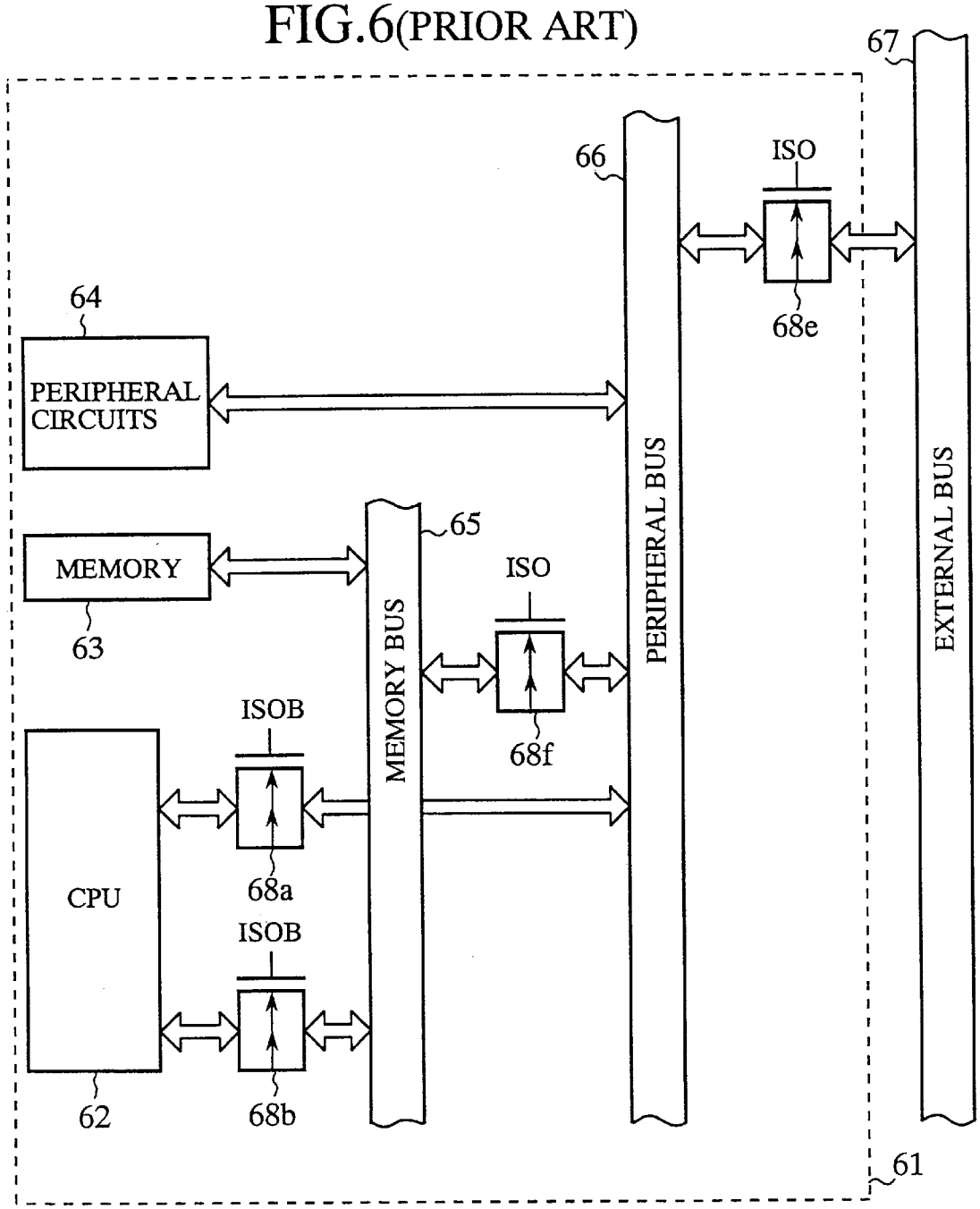
FIG. 6 is a block diagram of a conventional microcomputer.

FIG. 5 is a block diagram of the control signal generator in the fourth embodiment of the invention. In FIG. 5, reference numeral 17 represents a decoder used as a control signal generator (control signal generating means in the connecting means). The decoder 17 outputs the control signal PISO or MISO by decoding a mode signal inputted through the external bus 7 to designate whether the memory bus 5 or the peripheral bus 6 is to be selected for connection to the external bus 7 when the micr computer 1 is in the bus isolation mode. The decoder 17 outputs a High-level control signal PISO when the mode signal from the external bus 7 is decoded and found to be an address signal designating an address of the peripheral circuits 4 to be accessed from the external bus 7; the decoder 17 outputs a High-level control signal MISO when the mode signal from the external bus 7 is found to be an address signal pointing to an address of the memory 3. Reference numeral 18 denotes an external address bus over which the mode signal (i.e., address signal) is sent from the external bus 7 to the decoder 17.

How the fourth embodiment works will now be described.

When the microcomputer 1 is in a mode other than the bus isolation mode, the workings of the microcomputer are the same as those of the first embodiment and thus will not be described further.

When the microcomputer 1 is in the bus isolation mode, the control signal ISO is driven High and the control signal ISOB is brought Low. This turns off the transmission gates 8a and 8b (shown in FIG. 1), disconnecting the CPU 2 from the memory bus 5 and peripheral bus 6.

If the mode signal inputted to the decoder 17 from the external bus 7 via the external address bus 18 is found to designate an address of the memory 3, the decoder 17 drives the control signal MISO High and the control signal PISO Low. This turns off the transmission gate 8c and turns on the transmission gate 8d (shown in FIG. 1), disconnecting the peripheral bus 6 from the external bus 7 and connecting the memory bus 5 to the external bus 7. This means that the external bus 7 is connected to the memory bus 5 alone, which permits only the memory 3 to be accessed from the external bus 7.

In the bus isolation mode, when the mode signal inputted to the decoder 17 from the external bus 7 via the external address bus 18 is found to designate an address of the peripheral circuits 4, the decoder 17 drives the control signal MISO Low and the control signal PISO High. This turns on the transmission gate 8c and turns off the transmission-gate 8d, connecting the peripheral bus 6 to the external bus 7 and disconnecting the memory bus 5 from the external bus 7. This means that the peripheral bus 6 alone is connected to the external bus 7, which allows only the peripheral circuits 4 to be accessed through the external bus 7.

As described, when the microcomputer 1 of the fourth embodiment is in the bus isolation mode, the address signal inputted to the microcomputer 1 through the external address bus 18 causes either the memory bus 5 or the peripheral bus 6 alone to be selected as the internal bus connected to the external bus 7. The inventive structure allows reliable test data to be acquired in the bus isolation mode.

While preferred embodiments of the invention have been described using specific terms, such description is for illustrative purposes only, and it is to be understood that changes and variations may be made without departing from the spirit or scope of the following claims.

What is claimed is:

1. A microcomputer having a memory bus and a peripheral bus, said memory bus connecting a CPU to a memory, said peripheral bus connecting said CPU to peripheral circuits, said microcomputer comprising:

a connecting means for connecting an external bus to said memory bus in response to a first input mode signal input from said external bus in a bus isolation mode without use of said peripheral bus in which said memory it tested without intervention of said CPU; and said connecting means also for connecting said external bus to said peripheral bus in response to a second input mode signal input from said external bus in a bus isolation mode in which said peripheral circuits are tested without intervention of said CPU.

2. A microcomputer according to claim 1, wherein said connecting means includes:

first gate means for connecting and disconnecting said external bus to and from said peripheral bus;

second gate means for connecting and disconnecting said external bus to and from said memory bus; and control signal generating means for generating control signals to control connecting and disconnecting operations of said first and said second gate means.

3. A microcomputer according to claim 2, wherein said control signal generating means includes latch means for latching said first and second input mode signal.

4. A microcomputer according to claim 2, wherein said control signal generating means includes a decoder for decoding said first and second input mode signal.

5. A microcomputer according to claim 1, wherein said connecting means acts as selecting means for selecting either said memory bus or said peripheral bus to be connected constantly in response to an external signal.

6. A microcomputer comprising:

a central processing unit;

at least one memory device;

at least one peripheral circuit;

a memory bus, wherein said memory bus connects said central processing unit to said at least one memory device;

a peripheral bus, wherein said peripheral bus connects said central processing unit to said at least one peripheral circuit; and a connecting means for connecting an external bus to said memory bus in response to a first input mode signal input from said external bus in a bus isolation mode without use of said peripheral bus in which said at least one memory device is tested without intervention of said CPU; and said connecting means also for connecting said external bus to said peripheral bus in response to a second input mode signal input from said external bus in a bus isolation mode in which said peripheral circuits are tested without intervention of said CPU3;

wherein testing of any one of said at least one memory device and said at least one peripheral circuit in the bus isolation mode is carried out under conditions equivalent to conditions in effect during other modes of operation.

7. A microcomputer according to claim 6, wherein said connecting means includes:

first gate means for connecting and disconnecting said external bus to and from said peripheral bus;

second gate means for connecting and disconnecting said external bus to and from said memory bus; and control signal generating means for generating control signals to control connecting and disconnecting operations of said first and said second gate means.

8. A microcomputer according to claim 7, wherein said control signal generating means includes latch means for latching said first and second input mode signal.

9. A microcomputer according to claim 7, wherein said control signal generating means includes a decoder for decoding said first and second input mode signal.

10. A microcomputer according to claim 6, wherein said connecting means acts as selecting means for selecting either said memory bus or said peripheral bus to be connected constantly in response to an external signal.

* * * * *